US007382636B2

(12) United States Patent
Baarman et al.

(10) Patent No.: US 7,382,636 B2
(45) Date of Patent: Jun. 3, 2008

(54) SYSTEM AND METHOD FOR POWERING A LOAD

(75) Inventors: David W. Baarman, Fennville, MI (US); John J. Lord, Springfield, IL (US); Wesley J. Bachman, Auburn, IL (US)

(73) Assignee: Access Business Group International LLC, Ada, MI (US)

( * ) Notice: Subject to any disclaimer, the term of this patent is extended or adjusted under 35 U.S.C. 154(b) by 186 days.

(21) Appl. No.: 11/251,409

(22) Filed: Oct. 14, 2005

(65) Prior Publication Data

US 2007/0086225 A1 Apr. 19, 2007

(51) Int. Cl.
*H02M 7/537* (2006.01)

(52) U.S. Cl. ........................ 363/97; 363/21.02; 363/40; 363/132

(58) Field of Classification Search ................. 363/37, 363/40, 47, 109, 110, 118, 21.02, 21.04, 21.06, 363/21.1, 21.14, 21.18, 21.26, 97, 132
See application file for complete search history.

(56) References Cited

U.S. PATENT DOCUMENTS 4,488,199 A 12/1984 Bloomer
5,387,846 A * 2/1995 So ........................ 315/209 R
5,770,925 A 6/1998 Konopka et al.
5,883,473 A 3/1999 Li et al.
6,653,800 B2 11/2003 Chen
6,667,584 B2 12/2003 Hooijer et al.
6,720,739 B2 4/2004 Konopka
6,919,694 B2 * 7/2005 Moyer et al. ............... 315/224
2004/0012985 A1 * 1/2004 Ribarich .................. 363/21.02
2004/0130915 A1 * 7/2004 Baarman ................. 363/21.02
2004/0130916 A1 * 7/2004 Baarman ................. 363/21.02
2005/0093475 A1 * 5/2005 Kuennen et al. ........ 315/209 R

* cited by examiner

*Primary Examiner*—Jeffrey Sterrett
*Assistant Examiner*—Stuart Hansen
(74) *Attorney, Agent, or Firm*—Warner Norcross & Judd LLP

(57) ABSTRACT

A power supply for inductively powering a remote device has an inverter operating at an operating frequency and a primary coil. A phase comparator compares the phase of the voltage or current delivered by the power supply. If the phase relationship detected by the comparator is unacceptable, the inverter is disabled. After a period of time, the inverter is re-enabled, and the phase relationship is again determined.

17 Claims, 2 Drawing Sheets

SYSTEM AND METHOD FOR POWERING A LOAD

BACKGROUND OF THE INVENTION

Inductive powering of an intermittently energized device would be extremely convenient. A primary is provided at some convenient location. When placed in proximity to the primary, a device with a suitable secondary is energized without the need to connect a cord or cable to the device. However, with an inductive power supply, such rapid changing of power consumption is problematic.

Certain devices, such as those used for cooking, are designed to intermittently derive power from a power source. For example, an electric skillet uses significant power to heat its cooking surface to a desired temperature. When it reaches that temperature, the skillet ceases using power. If the cooking surface cools, it again uses significant power to heat the cooking surface.

An inductive power supply establishes a magnetic field from which the remote device draws power. The instantaneous cessation of power consumption by the remote device does not automatically end the magnetic field. Rather, the magnetic field previously established may continue to exist after the remote device is no longer drawing power. The inductive power supply could continue to supply power to the magnetic field, resulting in excessive currents within the power supply. If left unchecked, these large currents in the power supply can ultimately result in the destruction of the electronic components of the power supply, such as transistors and other semiconductor devices, rendering the power supply unusable.

An improved inductive circuit for powering a load is thus highly desirable.

DETAILED DESCRIPTION OF THE DRAWINGS

Figure 1:
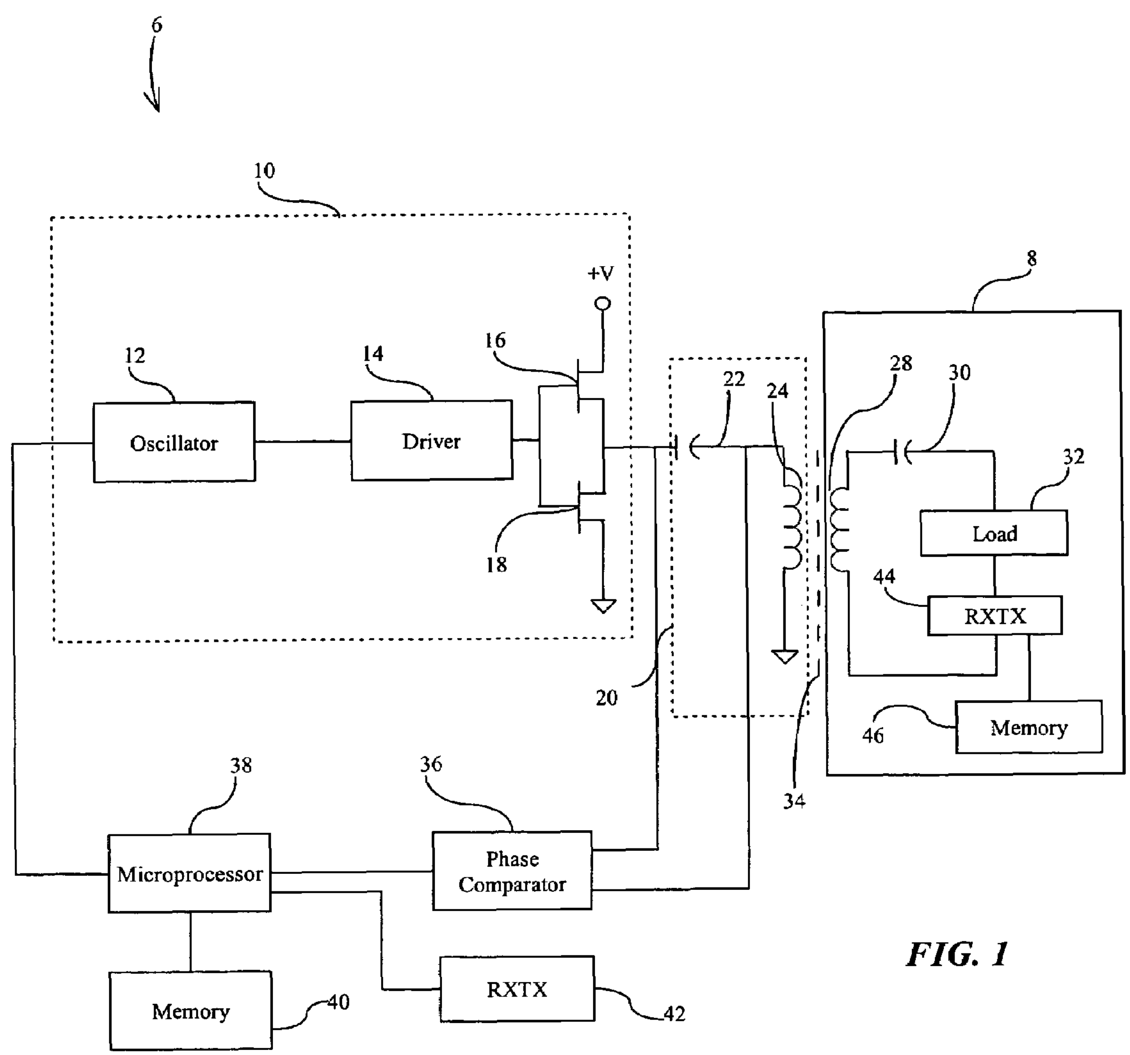
FIG. 1 shows an inductive power supply for powering an intermittent load.

FIG. 1 shows an inductive power supply 6 for powering remote device 8. Inverter 10 is conventionally comprised of oscillator 12, driver 14, and transistors 16, 18 to provide an alternating current to tank circuit 20. Tank circuit 20 is a series resonant circuit comprised of primary capacitor 22 and primary inductor 24. The power supply for the circuit could be any source of DC power such as an AC-DC converter or a battery.

Oscillator 12, driver 14 and tank circuit 20 can be conventional devices. A further description of suitable devices and circuits may be found in U.S. Pat. No. 6,825,620 entitled, "Inductively Coupled Ballast Circuit" U.S. patent application Ser. No. 10/689,499 entitled "Adaptive Inductive Power Supply", and U.S. patent application Ser. No. 10/689,148 entitled "Adaptive Inductive Power Supply with Communication." These patents and applications are hereby incorporated by reference.

Remote device 8 is comprised of secondary inductor 28, secondary capacitor 30, load 32, optional device transceiver 44 and optional memory 46. As is well known, secondary inductor 28 and secondary capacitor 30 provide power to remote device 32. Air gap 34 separates primary inductor 24 and secondary inductor 28. Preferably, primary inductor 24 and secondary inductor 28 are coreless.

One input to phase comparator 36 is the voltage provided to tank circuit 20. The second input to phase comparator 36 is the voltage provided to primary inductor 24. Phase comparator 36 provides a logical "0" to microprocessor 38 if the of voltage provided to tank circuit 20 and that provided to primary inductor 24 are in phase. If the two voltages are not in phase, then phase comparator 36 provides a logical "1" output to microprocessor 38.

In operation, when remote device 8 is drawing power, the voltages provided to tank circuit 20 and primary inductor 24 are in phase. However, when remote device 8 no longer draws power, the voltages provided to tank circuit 20 and primary inductor 24 go out of phase. Phase comparator 36 provides a logical "1" output when the voltages are out of phase.

In order to distinguish minor variations in the phase of the voltage provided to remote device 8 from the situation where remote device 8 no longer draws power, phase comparator 36 provides a logical "1" output only when the voltages are out of phase by about 90 degrees. As is well known, phase comparator 36 could be adjusted to provide a logical "1" output for different out of phase conditions. For example, phase comparator 36 could provide a logical "1" output when the voltages are out of phase by 45 degrees.

Microprocessor 38 controls the operation of oscillator 12. When the output of the phase comparator is "0", then microprocessor 38 enables the operation of inverter 10.

However, when the phase of the voltages detected by phase comparator are out of phase, microprocessor disables the operation of inverter 10, and thus immediately stops further power from flowing through tank circuit 20. Alternatively, microprocessor 38 could be replaced by suitable analog or digital circuitry which could disable oscillator 12 based upon the output of phase comparator 36.

Phase comparator 36 is a simple go/no-go phase comparator. The phase detector is comprised an exclusive-OR gate, a low pass filter, and a voltage comparator. The low pass filter provides linear phase information between 0° and 90°.

Alternatively, a phase comparator 36 could be digitized so as to provide a scalar quantity indicative of the phase difference between the two voltages. If so, then memory 40 would contain values indicative of an acceptable phase relationship and values indicative of an unacceptable phase relationship. Microprocessor 38 would read the output of phase comparator 36 and then compare the read value with the values within memory 40 and then disable the operation of oscillator 12 as needed.

The time delay involved resulting due to the use of microprocessor 38 for phase detection could be detrimental in some applications. If the Q of tank circuit 20 is high, the delay could result in damage to transistors 16, 18. However, if the Q of tank circuit 20 was sufficiently low, microprocessor 38 could be used in some applications.

Power supply 6 could also be provided with power supply transceiver 42 for receiving information from optional remote device transceiver 44. Remote device transceiver 44 would provide information to microprocessor 38 regarding the expected or acceptable phase relationship detected by phase comparator 36 during power transfer to remote device 8. Microprocessor 38 could then store this information within memory 40 for use in determining whether remote device 8 was receiving power. Microprocessor 38 then compares the output of phase comparator 36 with information from memory 8. Microprocessor 38 could then disable the operation of oscillator 12 if needed. For example, if remote device 8 requires that the phase relationship measured by phase detector 36 is no more than 45 degrees out of phase during normal operation, and voltages measured by phase detector 36 are 50 degrees out of phase, then microprocessor 38 could disable the operation of oscillator 12.

Remote device transceiver 44 could employ any of a number of devices such as an RFID tag, a wireless LAN transmitter or a Bluetooth transmitter. Remote device could also be provided with remote device memory 46 which would contain the phase information. Alternatively, memory 40 could store the expected phase relationship for a plurality of devices. Remote device transceiver 44 could transmit an identifying code to remote device 8, and then processor 38 would look up the corresponding phase information from memory 40. Microprocessor 38 could then compare the output of phase comparator 36 with the phase information retrieved from memory 40. If the phase information retrieved from memory 40 does not correspond with the output of phase comparator 36, then microprocessor could disable the operation of oscillator 12.

After microprocessor 38 has disabled oscillator 12 as described above, microprocessor 38 re-enables the operation of oscillator 12 after a predetermined period of time. If the output of phase comparator 36 indicates an acceptable phase relationship, thereby indicating that remote device 32 is again ready to receive power, then microprocessor 38 continues to enable the operation of oscillator 12. If, however, the output of phase comparator 36 indicates an unacceptable phase relationship as described above, the microprocessor again disables oscillator 12 and pauses for a second predetermined period of time before re-enabling oscillator 12.

Figure 2:
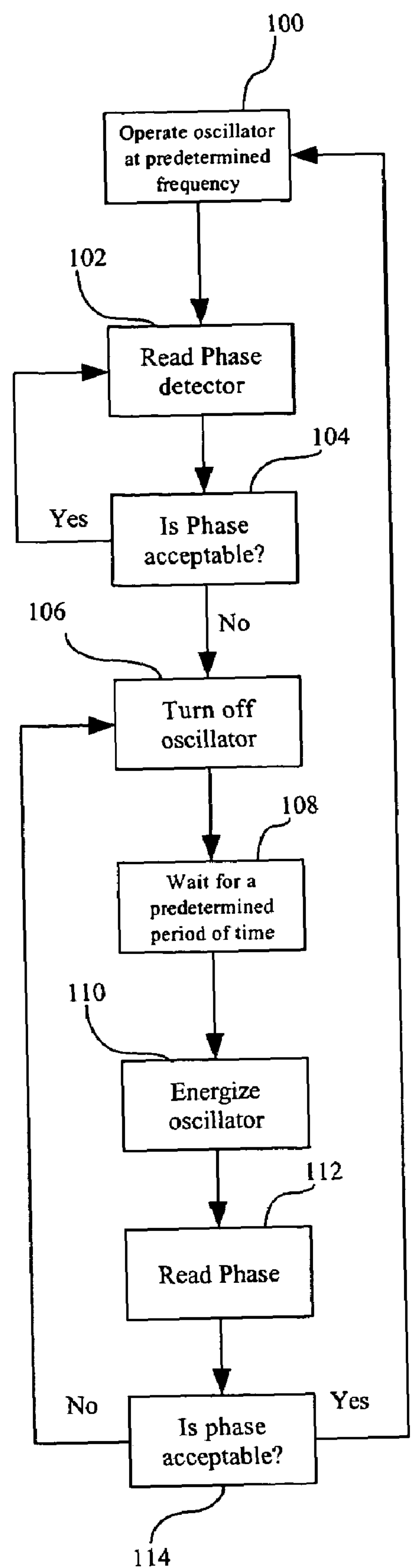
FIG. 2 shows the method of operation for a circuit supplying inductive power to an intermittent load.

FIG. 2 shows a method for operating the circuit shown in FIG. 1. The oscillator 12 first operates at the predetermined frequency. Step 100. The phase detector is read. Step 102. A reading every 5 ms has proven to be acceptable.

The phase is then evaluated to determine whether the phase is acceptable. Step 104.

If the phase is not acceptable, the oscillator is turned off. Step 106. The oscillator remains turned off for a first predetermined period of time. Step 108. The length of time the oscillator remains off is dependent upon the particular application. A period of one minute has been found to be acceptable if inductive power supply 6 is for used with cooking utensils such as frying pans.

The oscillator is then energized. Step 110. The energization of oscillator 12 is to probe to determine whether remote device 8 was again drawing power. The oscillator could be operated at the initial frequency or at a different "probe" frequency. In some applications, it could be advantageous to have a probe frequency different from the operating frequency of the circuit. According to one embodiment, the "probe" frequency is a predetermined frequency which is outside the expected operating or resonant frequency for remote device 8. For example, if remote device 8 is expected to operate at a frequency, or a range of frequency's between 40 KHz a 50 Hz, then probe frequency could be set at range of 75 KHz to 80 KHz. In selecting a probe frequency, care must be taken to avoid both the resonant frequency of the circuit loaded and unloaded, but also any harmonic resonant frequencies.

The phase is again read and evaluated. Steps 112, 114. If the phase is acceptable, the circuit operates as usual. If the phase is not acceptable, the oscillator is turned off. Step 106. Monitoring then continues from that point.

The above described inductive power supply is ideal for supplying power to a device intermittently using relatively large amounts of electrical energy. The power supply can rapidly detect changes in the load requirements and then automatically and temporarily shut down in order to avoid damage to the power supply.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A circuit for powering a remote device comprising:
- an inverter operating at the operating frequency;
- a tank circuit including a capacitor and an inductor for transferring power to the remote device;
- a phase comparator for comparing the phase of the voltage supplied to the tank circuit with the phase of the voltage between the capacitor and the inductor of the tank circuit and generating a first phase comparison; and
- a disabling means for disabling the inverter as a function of the first phase comparison.

2. The circuit of claim 1 where the inverter further comprises a first switch.

3. The circuit of claim 2 where the inverter further comprises a driver coupled to the switch.

4. The circuit of claim 3 where the inverter further comprises an oscillator for operating the switch at the operating frequency.

5. The circuit of claim 1 further comprising:
- a receiver for receiving an expected phase relationship from the remote device;
- wherein said disabling means disables the inverter as a function of the first phase comparison and the expected phase relationship for the device.

6. The circuit of claim 1 where the disabling means disables the inverter based on the output of the phase comparator being indicative that the phase of the voltage supplied to the inductor and the phase of the voltage supplied to the tank circuit are out of phase by a predetermined amount.

7. The circuit of claim 6 where the circuit has a second switch.

8. The circuit of claim 7 where the first switch and the second switch are arranged in series.

9. The circuit of claim 1 where the disabling means is a processor and the circuit further comprising:
- a receiver for receiving an identifying code from the remote device;
- wherein the processor includes a memory for processing the identifying code to look up an expected phase relationship for the remote device from the memory, the microprocessor compares the expected phase relationship to the first phase comparison of the phase comparator to generate a second phase comparison and disables the inverter as a function of the first phase comparison and the second phase comparison.

10. The circuit of claim 8 where the disabling means is an analog circuit.

11. The circuit of claim 8 where the disabling means is a digital circuit.

12. A method of operating a circuit comprising:
- operating an inverter at a first frequency to power a tank circuit including a capacitor and an inductor;

determining a first operating phase of the inverter;

determining a first operating phase of the voltage between the capacitor and the inductor of the tank circuit;

comparing the first operating phase of the inverter to the first operating phase of the voltage between the capacitor and the inductor of the tank circuit to generate a first comparison; and disabling the inverter in response to the first comparison.

13. The method of claim 12 where the inverter includes an oscillator, and the step of disabling the inverter includes disabling the oscillator.

14. The method of claim 13 where disabling the inverter comprises:

disabling the inverter in response to comparing the first comparison with a value stored in a memory.

15. The method of claim 14 further comprising:

waiting for a period of time in response to the disabling;

operating the inverter at a second frequency;

determining a second operating phase of the inverter;

determining a second operating phase of the voltage between the capacitor and the inductor of the tank circuit;

comparing the second operating phase of the inverter to the second operating phase of the voltage between the capacitor and the inductor of the tank circuit to generate a second comparison; and disabling the inverter in response to the second comparison.

16. The method of claim 15 where the first frequency is the same as the second frequency.

17. The method of claim 15 where the first frequency is different from the second frequency.

* * * * *